United States Patent

Moerbe

[11] Patent Number: 6,163,746
[45] Date of Patent: Dec. 19, 2000

[54] DEVICE FOR DETERMINING A STEERING ANGLE OF A MOTOR VEHICLE

[75] Inventor: Matthias Moerbe, Ilsfeld-Helfenberg, Germany

[73] Assignee: Robert Bosch GmbH, Stuttgart, Germany

[21] Appl. No.: 09/146,145

[22] Filed: Sep. 3, 1998

[30] Foreign Application Priority Data

Oct. 10, 1997 [DE] Germany ............ 197 44 722

[51] Int. Cl.⁷ ............................ B62D 15/02
[52] U.S. Cl. .............. 701/41; 324/207.11; 324/207.23; 341/15
[58] Field of Search ............... 701/36, 41, 42, 701/43; 180/400; 341/15; 324/207.11, 207.12, 207.14, 207.25, 207.23, 207.2, 207.22, 207.24

[56] References Cited

U.S. PATENT DOCUMENTS

| 5,434,784 | 7/1995 | Bradley et al. ............. 701/41 |
| 5,568,048 | 10/1996 | Schroeder et al. ........ 324/207.21 |
| 5,646,523 | 7/1997 | Kaiser et al. ............. 324/207.2 |
| 5,825,178 | 10/1998 | Hipp et al. .............. 324/207.2 |
| 5,880,586 | 3/1999 | Dukart et al. ............ 324/207.2 |

FOREIGN PATENT DOCUMENTS

| 0 698 781 A1 | 2/1996 | European Pat. Off. . |
| 195 43 562 A1 | 5/1996 | Germany . |
| 2 305 559 | 4/1997 | United Kingdom . |
| 95/25660 | 9/1995 | WIPO . |
| PCT/DE 95/00343 | 10/1995 | WIPO . |

OTHER PUBLICATIONS

Patent Abstract of Japan vol. 012, No. 411 (P–779), Oct. 31, 1988 & JP 63 148102 A (Matsushita Electric Ind Co. Ltd), Jun. 21, 1988.

*Primary Examiner*—William A Cuchlinski, Jr.
*Assistant Examiner*—Edward Pipala
*Attorney, Agent, or Firm*—Michael J. Striker

[57] ABSTRACT

The device for determining a steering angle of a motor vehicle with a steering column, a steering mechanism and a steering tie rod includes a device for generating a fine signal according to an angular position of the steering wheel, a device for generating a coarse signal according to a number of revolutions through which the steering column has been turned in one or the other direction, and a device for combining the fine signal and the coarse signal to obtain the steering angle. An essential simplification and improvement of the arrangement is obtained when the fine signal device includes a permanent magnet having a permanent magnetic field and rigidly attached to the steering column so that the permanent magnet rotates with the steering column and a sensor for a magnetic field direction of the permanent magnetic field from the permanent magnet, and the coarse signal device connected with the steering tie rod determines the steering tie rod motion direction and steering tie rod displacement over at least a portion of an entire displacement range of the steering tie rod without contact with it and produces a digital output signal according to the steering tie rod displacement and motion direction.

7 Claims, 2 Drawing Sheets

DEVICE FOR DETERMINING A STEERING ANGLE OF A MOTOR VEHICLE

BACKGROUND OF THE INVENTION

The present invention relates to a device for determination of the steering angle in a motor vehicle and, more particularly, to a device for determination of the steering angle in a motor vehicle with a steering column, a steering mechanism and a steering tie rod, wherein the device comprises a first means for generating a fine signal according to the angular position of the steering wheel, a second means for generating a coarse signal according to the number of revolutions through which the steering column has been turned in one or the other direction and means for coupling or combining the fine signal and the coarse signal to obtain the steering angle.

The actual steering wheel position is required for safety reasons immediately after operation of the ignition switch for certain safety systems in a motor vehicle, e.g. for the vehicle dynamic control. In motor vehicles equipped in this way steering wheel angular position sensors operating as absolute sensors are required, which allow a definite determination of the angular position immediately after turning on. A steering wheel angular position sensor is known, for example, from International Patent Application PCT/DE 95/00343.

This known sensor for determination of the steering wheel angular position of the motor vehicle has a first code disk, that is detected by a first plurality of receivers or sensors and which rotates with the same speed as the steering wheel. A second code disk rotates with a quarter of the speed as the first code disk and has three code tracks that are detected by a second plurality of sensors. In an associated microcontroller the so-called fine signal is derived from the output signal of the sensors associated with the first code disk, while the second sensors supply the coarse signal, since the fine signal repeats itself after an angular rotation of ±720°, also 1440°. An accurate determination of the steering angle can be performed by a suitable coupling or combining of the fine and coarse signals.

Also code disks which have cavities forming the actual code are used in the known sensor for determination of the steering wheel angle. Hall barrier devices that each cooperate with a magnet are used as sensors. The Hall barrier devices are located on one side of the code disk, while the magnets are located on the other side of the code disk. Thus the code disk acts as a diaphragm and the Hall barrier devices produce output signals that detect whether or not a cavity of the code disk is located between the Hall barrier device and the associated magnet.

The known arrangement for detection of the steering angle in the motor vehicle is very expensive, especially in its manufacture and construction. If the coarse signal is derived from a gear controlled by the steering column, then tolerances very strongly effect the precision of the measured steering angle. Furthermore a suitable driving torque is required for this arrangement.

SUMMARY OF THE INVENTION

It is an object of the present invention to provide an arrangement for determination of steering angle in a motor vehicle of the above-described kind that allows an accurate determination of steering angle with a substantially reduced expense and practically negligible driving torque.

This object, and others which will be made more apparent hereinafter, are attained in a device for determination of the steering angle in a motor vehicle with a steering column, a steering mechanism and a steering tie rod, wherein the device comprises a first means for generating a fine signal according to the angular position of the steering wheel, a second means for generating a coarse signal according to the number of revolutions through which the steering column has been turned in one or the other direction and means for coupling or combining the fine signal and the coarse signal to obtain the steering angle.

According to the invention a permanent magnet acting as the first means is rigidly attached to the steering column so that it rotates in front of a fine signal sensor including means for sensing a magnetic field direction of the magnetic field from the permanent magnet, and a coarse signal sensor device is associated with the steering tie rod as the second means to determine the steering tie rod motion direction and steering tie rod displacement over displacement range parts of its entire displacement range in a contactless manner and to produce a digital output signal according to the displacement and motion direction of the steering tie rod.

In the structure according to the invention the steering column only carries a permanent magnet and the steering tie rod only carries a magnetic strip. The remaining elements, such as the fine signal sensor and the coarse signal sensor together with analysis devices, are coupled in a contactless manner with the steering system and can be easily mounted on different steering systems. The tolerances of the Cardanically driven steering column do not effect the results and the arrangement is independent of the structure of the steering column and the steering stock switch. If the motor vehicle is provided with an adjustable steering column, then the crash behavior of the steering column is not impaired by this new device or arrangement.

The coarse signal sensor device is easily fit to other gears in the steering mechanism, e.g. for commercial vehicles. An additional advantage of the new structure is that no noise is provided by the device according to the invention. The sensors do not need to be placed in a stand-by-operation mode, since the actual steering angle is immediately determined by means of the analog fine signal and the digital coarse signal when the supply voltage is turned on.

The determination of the angular position of the steering column is especially simple, when an AMR sensor (anisotropic magnetic resistance) that generates a potentiometric fine signal according to the angular position of the permanent magnet is used as the fine signal sensor.

According to one embodiment the position of the steering tie rod in a predetermined maximum motion range is accurately determined when a magnetic strip that is divided into magnetic regions having different magnetic field directions, and a coarse signal sensor generates a coarse signal according to the determined magnetic field direction. According to one embodiment, the magnetic field of the magnetic strip has a width that corresponds to the displacement of the steering tie rod in a half revolution of the steering column.

A rapid transition of the coarse signal is guaranteed when the magnetic strip is divided into two halves with four magnetic regions that change magnetic field direction about 90° from magnetic region to region in each half and in the center of the magnetic strip the magnetic field direction changes from adjacent magnetic field about 135°.

A magnetic strip made of a magnetizable polymeric material has proven useful.

The apparatus can be further developed appropriately so that the analog fine signal of the fine signal sensor and the digital coarse signal of the coarse signal sensor can be input to a converter that supplies a suitable information signal according to the measured steering angle to a further processor device.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
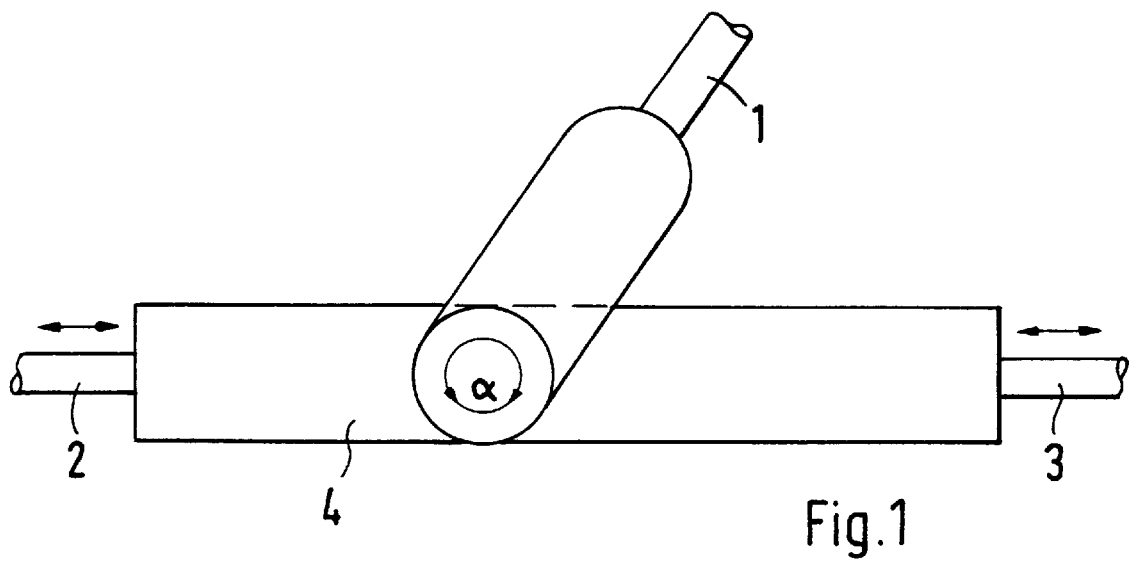
FIG. 1 is a simplified diagrammatic view of a steering mechanism for a motor vehicle.

Only the lower end of the steering column 1 and the steering mechanism 4 driven by it from the steering system are illustrated in FIG. 1. The steering mechanism 4 controls the positioning motion of both steering tie rods 2 and 3 in such a manner that both steering rods 2 are displaced to the left when the steering column 1 is rotated clockwise but are displaced to the right when the steering column 1 is rotated counterclockwise. The amount of the displacement depends on the angular position α of the steering column 1.

Figure 2:
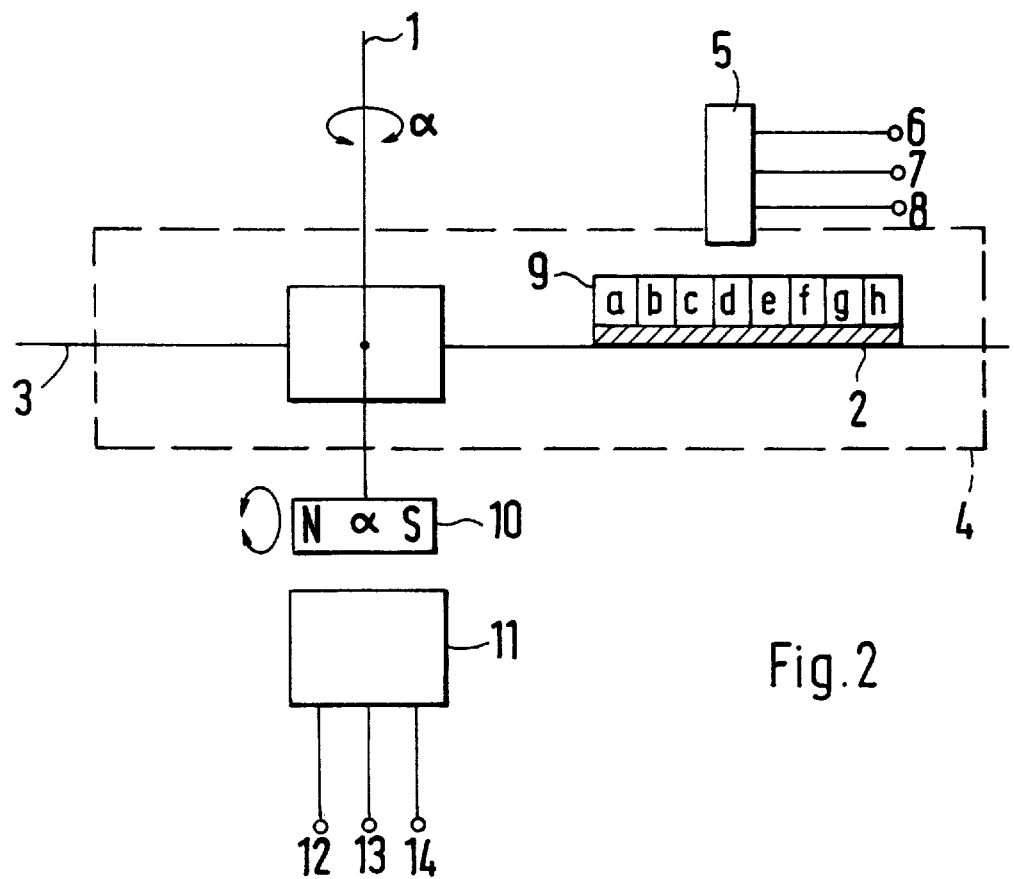
FIG. 2 is a principal block diagram of an apparatus for determining the steering angle according to the invention.
Figure 4:
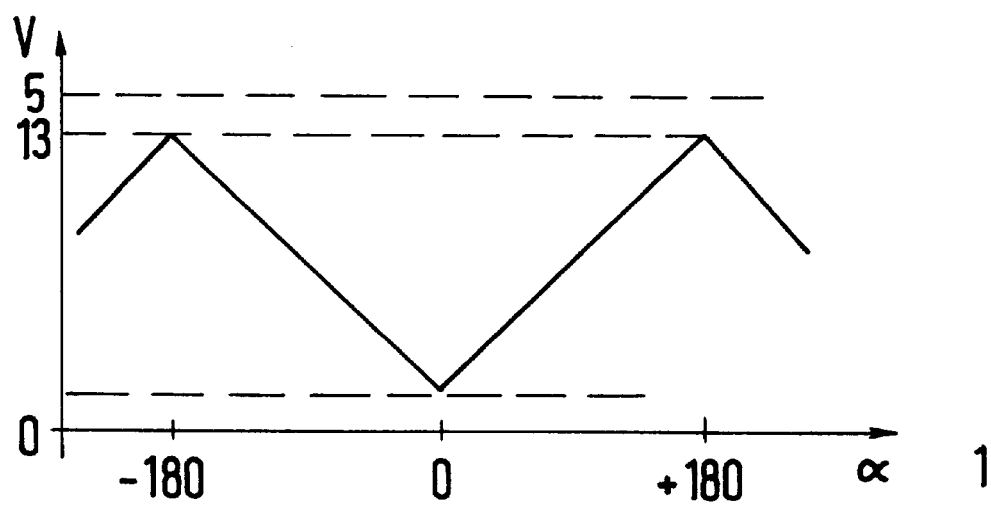
FIG. 4 is a graphical illustration of the dependence of the fine sensor signal on angle.

As shown in FIG. 2 a permanent magnet is attached rigidly to the steering column 1 so that it rotates without play with the steering column 1. A fine signal sensor 11 for determination of the angular position α that, for example, is constructed, e.g., as a magnetic field direction sensitive AMR sensor (anisotropic magnetic resistance), is arranged in front of the permanent magnet 10. The supply voltage is fed to the fine signal sensor 11 through its terminals 12 and 14 and the fine signal appears at its output 13. The fine signal depends on the angular position as shown in FIG. 4 and the position of the permanent magnet 10 formed as a bar magnet. In the present embodiment the fine signal sensor 11 outputs the lower voltage value of the analog voltage V in the initial position of the steering column 1. The voltage V increases with increasing angular displacement in the first half revolution until at the upper voltage value both in the displacement of the steering column 1 in the clockwise direction and in the counterclockwise direction. In the subsequent half-revolution the voltage V decreases continuously to the lower voltage value. This means that the voltage climbs during the odd number half-revolutions of the steering column 1 and drops during the even number half-revolutions in relation to the initial position associated with the even travel.

Figure 3:
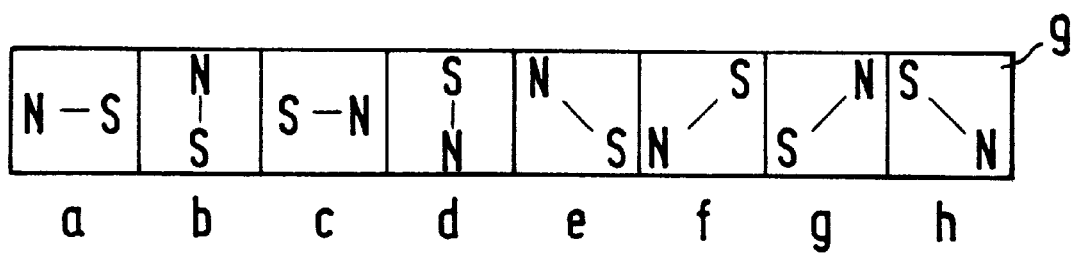
FIG. 3 is a diagrammatic plan view of an example of the magnetic strip mounted on the steering tie rod.

In order to obtain the angular position of the steering column 1 and the actual steering angle, the coarse signal must comprise coded coarse signals depending on the half-revolutions. Furthermore a coarse signal sensor 5 is provided which is sealed in the steering mechanism 4 and the displacement of the steering tie rod 2 is determined in both displacement direction according to the half-revolutions of the steering column. A magnetic strip 9 that is mounted on the steering tie rod 2 and moves past the coarse signal sensor 5 is associated with the coarse signal sensor 5. The magnetic strip 9 is formed as a magnetizable polymer strip which is divided into eight magnetic regions a to h that all have different magnetic field directions in the embodiment shown in FIG. 3. The coarse signal sensor 5 is magnetic field direction sensitive and eight different digital coarse signals are produced according to which of the magnetic regions a to h is positioned next to the coarse signal sensor 5. The width of the magnetic regions a to h extends over a part of the displacement path of the steering tie rod 2 which corresponds to a half revolution of 180° of the steering column. In the embodiment shown the magnetic strip 9 has eight magnetic regions associated with a two-fold revolution of the steering column 1 in each rotation direction. The entire displacement range of the steering tie rod 2 is distributed over the magnetic strip 9 into eight equal displacement range parts which pass by the fixed coarse signal sensor 5. In the initial position the coarse signal sensor 5 is located between the magnetic regions d and e on the magnetic strip 9. In each position of the steering mechanism 4 the actual steering angle can be immediately obtained by combining the analog fine signal from the fine signal sensor 11 and the digital coarse signal from the coarse signal sensor 5 with each other.

Figure 5:
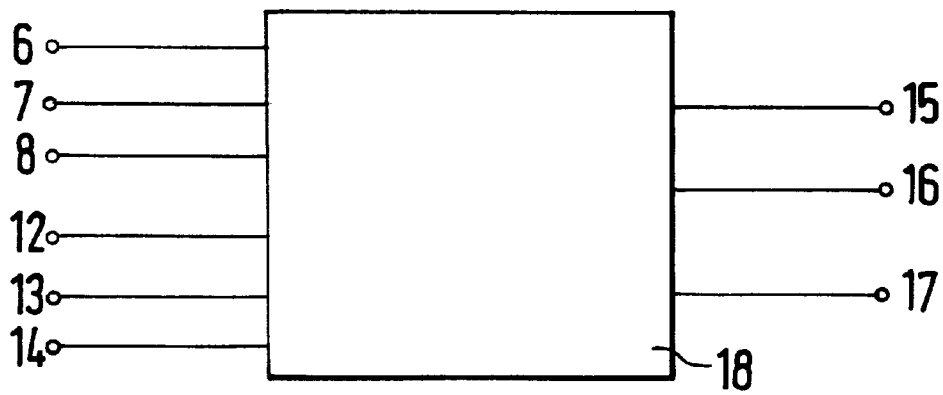
FIG. 5 is a simplified diagrammatic plan view of a converter for improving the fine and the coarse signals.

As shown in FIG. 5 the supply voltage for the sensors can be produced by a converter 18, to which the fine signal from the terminal 13 and the coarse signal from the terminal 7 of both sensors 10 and 5 are supplied. The converter 18 is supplied by means of the terminals 15 and 17 and provides an information signal at output 16 which is derived from the fine signal and the coarse signal and is adjusted for a further processing device, such as a CAN-, VAN-, SCP- or PWM-system. The converter 18 can, like the terminals 6, 8, 12 and 14 shown, supply the sensors 5 and 9 with a supply voltage. The converter 18 and the sensors 5 and 9 can be built-in components of the steering mechanism 4.

The disclosure of German Patent Application 197 44 722.8 of Oct. 10, 1997 is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in a device for determining a steering angle of a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A device for determining a steering angle of a motor vehicle, said motor vehicle including a steering column (1), a steering mechanism and a steering tie rod (2), wherein said device comprises first means for generating a fine signal according to an angular position of the steering column (1), second means for generating a coarse signal according to a number of revolutions through which the steering column (1) has been turned in one or the other direction, and means for coupling or combining the fine signal and the coarse signal to obtain the steering angle;

wherein the first means comprises a permanent magnet (10) having a permanent magnetic field and rigidly attached to the steering column so that the permanent magnet rotates with the steering column and a fine signal sensor (11) for sensing a magnetic field direction of the permanent magnetic field from the permanent magnet (10), and the second means comprises a coarse signal sensor (5) connected with the steering tie rod (2) to determine the steering tie rod motion direction and steering tie rod displacement over at least a portion of an entire displacement range of the steering tie rod without contact with the steering tie rod and to produce a digital output signal according to the steering tie rod displacement and motion direction.

2. The device as defined in claim 1, wherein fine signal sensor is an AMR sensor that generates a potentiometric fine signal according to an angular position of the permanent magnet.

3. The device as defined in claim 1, wherein the second means includes a magnetic strip (9) divided into a plurality of magnetic regions (a to h) having respective magnetic field directions and the magnetic strip (9) is attached to the steering tie rod and the digital output signal from the coarse signal sensor (5) is determined according to the magnetic field direction detected by the coarse signal sensor (5).

4. The device as defined in claim 3, wherein the magnetic regions (a to h) of the magnetic strip (9) each have a width corresponding to an amount of the displacement of the steering tie rod during a half-revolution (180°) of the steering column (1).

5. The device as defined in claim 3, wherein the magnetic strip (9) is divided into two halves with four of said magnetic regions in each of said two halves, the magnetic field direction changes 90° from magnetic region to magnetic region in each of said two halves and the magnetic field direction of the magnetic regions (d and e) adjacent a center of the magnetic strip (9) changes about 135°.

6. The device as defined in claim 3, wherein the magnetic strip (9) is formed as a magnetizable polymer strip.

7. The device as defined in claim 1, wherein the fine signal is an analog output signal from the fine signal sensor (11) and the coarse signal is a digital output signal from the coarse signal sensor (5) and the analog output signal and the digital output signal are fed to a converter (18) which feeds an information signal adjusted according to the measured steering angle to a further processing device (CAN; VAN; SCP; PWM).

* * * * *